(12) United States Patent
Muller (10) Patent No.: US 12,345,868 B2
(45) Date of Patent: Jul. 1, 2025

(54) DIGITAL MICROSCOPE AND METHOD OF OPERATING A DIGITAL MICROSCOPE

(71) Applicant: PreciPoint GmbH, Freising (DE)

(72) Inventor: Fritz Muller, Munich (DE)

(73) Assignee: PreciPoint GmbH, Freising (DE)

( * ) Notice: Subject to any disclaimer, the term of this patent is extended or adjusted under 35 U.S.C. 154(b) by 0 days.

(21) Appl. No.: 18/038,930

(22) PCT Filed: Nov. 25, 2021

(86) PCT No.: PCT/EP2021/082953
§ 371 (c)(1),
(2) Date: May 25, 2023

(87) PCT Pub. No.: WO2022/112395
PCT Pub. Date: Jun. 2, 2022

(65) Prior Publication Data
US 2024/0019679 A1 Jan. 18, 2024

(30) Foreign Application Priority Data
Nov. 25, 2020 (EP) .................................... 20209934

(51) Int. Cl.
*G02B 21/16* (2006.01)
*G02B 21/36* (2006.01)

(52) U.S. Cl.
CPC ........... *G02B 21/361* (2013.01); *G02B 21/16* (2013.01); *G02B 21/362* (2013.01)

(58) Field of Classification Search
USPC ........................................................ 348/79
See application file for complete search history.

(56) References Cited

U.S. PATENT DOCUMENTS 9,585,556 B2 * 3/2017 Buckland ................. A61B 3/14
11,630,066 B2 * 4/2023 Studer ................ G02B 26/0833
250/459.1

(Continued)

FOREIGN PATENT DOCUMENTS

CN 109062018 A 12/2018
EP 2607889 A2 6/2013

(Continued)

OTHER PUBLICATIONS

Mikkel Brydegaard et al., "Broad-band multispectral microscope for imaging transmission spectroscopy employing an array of light-emitting diodes", American Journal of Physics, American Association of Physics Teachers, US, vol. 77, No. 2, Feb. 1, 2009, pp. 104-110.

(Continued)

*Primary Examiner* — Helen Shibru
(74) *Attorney, Agent, or Firm* — Getz Balich LLC (57) ABSTRACT

A digital microscope includes a stage for holding a sample, a monochrome digital camera, an optical system, an illumination assembly for illuminating the sample, and a control unit for controlling the monochrome digital camera and the illumination assembly. The optical system is arranged between the stage and the monochrome digital camera. The illumination assembly is configured to provide illumination with three different wavelength ranges. The control unit is configured to control the illumination assembly to sequentially provide illumination with the three wavelength ranges. The control unit is configured to control the monochrome digital camera to take separate images during illumination with the three wavelength ranges.

19 Claims, 5 Drawing Sheets

(56) References Cited

U.S. PATENT DOCUMENTS

| | | | |
|---|---|---|---|
| 11,906,724 B2* | 2/2024 | Berretta | G02B 21/086 |
| 12,017,278 B2* | 6/2024 | Yacoubian | B33Y 30/00 |
| 2004/0064053 A1* | 4/2004 | Chang | G01N 21/6486 |
| | | | 600/478 |
| 2012/0013726 A1 | 1/2012 | Thorburn | |
| 2013/0041267 A1* | 2/2013 | Ntziachristos | A61B 5/0059 |
| | | | 600/476 |
| 2015/0248570 A1* | 9/2015 | Johansen | G06K 7/10722 |
| | | | 235/462.05 |
| 2016/0266366 A1* | 9/2016 | Chung | G02B 21/008 |
| 2019/0361216 A1 | 11/2019 | Berretta | |
| 2020/0026051 A1 | 1/2020 | Dixon | |
| 2021/0106224 A1* | 4/2021 | Zhou | G02B 6/04 |
| 2022/0159171 A1* | 5/2022 | Olson | G02B 21/002 |
| 2023/0258918 A1* | 8/2023 | Patra | G02B 21/365 |
| | | | 348/79 |
| 2024/0019679 A1* | 1/2024 | Muller | G02B 21/088 |

FOREIGN PATENT DOCUMENTS

| | | |
|---|---|---|
| EP | 2723065 A2 | 4/2014 |
| WO | 2017174998 A1 | 10/2017 |

OTHER PUBLICATIONS

Tominaga et al., "Spectral imaging by synchronizing capture and illumination", J. Opt. Soc. Am. A, vol. 29, No. 9, pp. 1764-1775, Sep. 2012, XP-002726407.

* cited by examiner

DIGITAL MICROSCOPE AND METHOD OF OPERATING A DIGITAL MICROSCOPE

This application claims priority to PCT Patent Appln. No. PCT/EP2020/082953 filed Nov. 25, 2021, which claims priority EP Patent Appln. No. 20209934.7 filed Nov. 25, 2010, which are herein incorporated by reference.

BACKGROUND OF THE INVENTION

1. Technical Field

The present invention is in the field of digital microscopy. In particular, the present invention is in the field of the overall system set-up of a digital microscope.

2. Background Information

Conventional digital microscopes have an illumination assembly, in operation emitting white light, a stage for holding a sample, an optical system, having microscope objective and a tube objective, and a color digital camera. In operation, the illumination assembly illuminates the sample on the stage by directing light through the sample and to the optical system towards the digital camera. The digital camera takes color images of the sample. Given the magnification of the optical system and the desire to detect/examine very small structures/features in the sample, the resolution of digital cameras, as currently used in digital microscopes, is not always satisfactory. Also, current set-ups of digital microscopes tend to be very costly.

Accordingly, it would be beneficial to provide a digital microscope with an overall system design that allows for a high image resolution/high representation accuracy at a reasonable cost/reasonable system complexity. Also, it would be beneficial to provide an according method of operating a digital microscope.

SUMMARY OF THE INVENTION

Exemplary embodiments of the invention include a digital microscope, comprising: a stage for holding a sample; a monochrome digital camera; an optical system, arranged between the stage and the monochrome digital camera; an illumination assembly for illuminating the sample; and a control unit for controlling the monochrome digital camera and the illumination assembly; wherein the illumination assembly is configured to provide illumination with three different wavelength ranges, and wherein the control unit is configured to control the illumination assembly to sequentially provide illumination with the three wavelength ranges and wherein the control unit is configured to control the monochrome digital camera to take separate images during illumination with the three wavelength ranges.

Exemplary embodiments of the invention allow for the provision of digital microscopic images at a high resolution/representation accuracy. As compared to previous approaches, the digital microscope in accordance with exemplary embodiments of the invention is able to provide digital color images, without relying on a color camera. Common color cameras are so-called Bayer filter cameras, relying on a color filter matrix, having red, blue and green filter pieces and being arranged before the image sensor, for generating the color representation of the sample. By design, the color filter pieces are offset from each other, with said offset posing a limitation to the achievable resolution/representation accuracy. Also, in said Bayer filter cameras, the extension of 2×2 color filter pieces and of the associated sensor cells limits the size of a single image pixel, posing another limitation for the achievable resolution/representation accuracy. In exemplary embodiments of the invention, instead of offsetting three representations of a sample in space, as has been previously done with a Bayer filter camera, the three representations of the sample are staggered in time. The three different wavelength ranges provide a sequence of three different modes of illumination. No spatial shift between different representations of the sample is present on the camera side of the digital microscope, and a very high integration density of real image pixels in the camera can be achieved. Also, the need for a comparably expensive color camera may be eliminated. Further, as compared to so-called three-chip cameras, a single image sensor can be used and light splitting before the image sensors can be dispensed with. A particularly beneficial trade-off between high resolution/representation accuracy and reasonable cost/complexity of implementation may be achieved.

The digital microscope may also be referred to as digital light microscope. In particular, the digital microscope may be a transmitted light microscope, with the illumination assembly and the monochrome digital camera being arranged on opposite sides of the stage/sample. In an operation position of the digital microscope, the illumination assembly may shine light upwards from a lower portion of the digital microscope towards the stage/sample and towards the optical system and monochrome digital camera.

The illumination assembly is configured to provide illumination with three wavelength ranges. The illumination assembly may be switchable between providing illumination with the three different wavelength ranges. In other words, the illumination assembly may be operable to selectively provide illumination with any of the three wavelength ranges. The switching between the three different wavelength ranges/the selective provision of illumination with the three different wavelength ranges may be controlled by the control unit. The control unit may control every single switch between the wavelength ranges or may control by triggering a predefined illumination pattern or may perform any other suitable control for achieving a time-selective illumination with the three different wavelength ranges. The expression of the illumination assembly being configured to provide illumination with three different wavelength ranges is understood as the illumination assembly being configured to provide illumination with at least three different wavelength ranges. It is also possible that the illumination assembly is configured to provide illumination with four or five or six or more different wavelength ranges.

The control unit is configured to control the illumination assembly to sequentially provide illumination with the three wavelength ranges and is configured to control the monochrome digital camera to take separate images during illumination of the stage with the three wavelength ranges. In operation, the control unit may provide illumination of the sample, arranged on the stage, with each of the three wavelength ranges in sequence. Further, the control unit may control the monochrome digital camera to take a sequence of separate images during illumination of the sample, with the separate images corresponding to the instances of illumination with the different wavelength ranges. The control unit is configured to provide a synchronized illumination and acquisition of digital image data. Via the synchronized control of the illumination assembly and the monochrome digital camera, the provision of illumination with a particular one of the three different wavelength ranges is accompanied by the taking of a particular image in the sequence of images. The control unit may be seen as an instance that synchronizes the provision of a light flash, as emitted by the illumination assembly, with the shutter/exposure of the image sensor of the monochrome digital camera. The sequential provision of illumination and the taking of separate images may also be referred to as the provision of a series/sequence of instances of illumination and an associated series/sequence of instances of acquisition of monochrome digital images.

The control unit is configured to control the illumination assembly to sequentially provide illumination with the three wavelength ranges and is configured to control the monochrome digital camera to take separate images during illumination of the stage with the three wavelength ranges. By providing illumination with three different wavelength ranges and by taking separate images for the instances of illumination with the different wavelength ranges, it is possible to acquire image data that allows for assembling a color image. Accordingly, a color representation may be achieved, without relying on a color camera. The monochrome image data and the assembled color image may be representations of a portion of the sample, with the size of the portion of the sample depending on the magnification implemented in the optical system. It is also possible that the monochrome image data and the color image provide a full representation of the sample, e.g. in the form of an overview picture.

The digital microscope comprises a stage for holding a sample. The stage may be stationary within the digital microscope. However, it is also possible that the stage is movable with respect to the monochrome digital camera, the optical system, and the illumination assembly. In particular, the stage may be movable in an x-y-plane, with the light, passing from the illumination assembly through the stage, to the optical system, and to the monochrome digital camera, being substantially in a z-direction. Different portions of a sample may be illuminated and captured by the digital camera via moving of the stage. The stage may have a light transmissive portion, onto which the sample may be placed. It is also possible that the stage has a frame-like structure, with the sample being placed in an empty space in the center of said frame. In this way, the stage does not interfere at all with the light path from the illumination assembly to the monochrome digital camera. The sample may also be referred to as specimen herein. The sample may be provided in the form of a microscope slide. The substance/material to be examined may be placed on/within said slide, and the slide may provide a well-defined mechanical structure for placing the sample reliably on the stage.

The monochrome digital camera, the optical system, and the illumination assembly may be substantially stationary in the digital microscope. In particular, the illumination assembly may be entirely stationary in the digital microscope. The optical system and the monochrome digital camera may be slightly movable in terms of their distance to the stage, e.g. for setting a focal plane in accordance with a particular sample being examined. It is also possible that the optical system and the monochrome digital camera may be adaptable in position on a larger scale, e.g. for adapting the digital microscope to different levels of magnification in the optical system.

The digital microscope has an optical system, arranged between the stage and the monochrome digital camera. The optical system may comprise a microscope objective and a tube objective. The magnification of the sample may be set by the particular designs of the microscope objective and the tube objective. The microscope objective and/or the tube objective may be exchangeable, so that different magnifications may be implemented. The tube objective may be arranged between the microscope objective and the monochrome digital camera. The tube objective may also be referred to as tube lens.

According to a further embodiment, the control unit is configured to control the illumination assembly to sequentially provide light flashes with the three wavelength ranges. By providing the illumination with the three different wavelength ranges as light flashes, the illumination duration may be suitably set on the basis of the overall system considerations. For example, a sensitivity of the monochrome digital camera and/or an optical efficiency of the optical system and/or an optical efficiency of the interior set-up of the illumination assembly and/or an intensity of the light source (s) within the illumination assembly and/or other factors may be taken into account. The control unit may in particular be configured to control the illumination assembly to provide light flashes of a duration of less than 10 ms, further in particular less than 1 ms, further in particular less than 100 µs. With the given light flash durations, a high acquisition speed for the sequence of separate images may be achieved, while giving the monochrome digital camera a convenient window for opening the shutter/exposing the image sensor. Further in particular, the control unit may be configured to control the illumination assembly to provide light flashes of a duration of between 5 µs and 100 µs. In this way, the light flashes may provide illumination over the full shutter time, even when a very fast monochrome digital camera with a shutter time of 5 µs is used, while allowing for a very quick sequence of light flashes with different wavelength ranges and, thus, for a very quick acquisition of image data.

According to a further embodiment, the control unit is configured to control the stage to move, while the monochrome digital camera takes the separate images during illumination of the stage with the three wavelength ranges. In particular, the control unit may be configured to control the stage to move continuously, while the monochrome digital camera takes the separate images during the illumination of the stage with the three wavelength ranges. By moving the stage during the acquisition of the image data and the sequential illumination with the three wavelength ranges, the acquisition of the three monochrome digital images may be conveniently embedded into a high-speed scanning of the sample with the digital microscope. Further in particular, with the control unit controlling the illumination assembly to repeatedly cycle through the sequence of illumination with the three wavelength ranges, different portions of the sample may be photographed with three different wavelength ranges. This in turn may allow for the individual images to be stitched, in order to generate a large area representation of the sample. Both the space dimension with respect to the sample and the wavelength dimension with respect to the illumination may be taken care of by a single motion of the stage and an according a synchronized control of the stage, the monochrome digital camera, and the illumination assembly.

According to a further embodiment, the control unit is configured to control the illumination assembly to cycle through the three wavelength ranges for sequentially providing illumination with the three wavelength ranges in a repetitive pattern. The control unit may further be configured to control the monochrome digital camera to take a sequence of monochrome digital images, with each of the separate digital monochrome images being associated with a particular position of the stage and a particular one of the three wavelength ranges. The control unit or a downstream image processing device may be configured to combine the sequence of monochrome digital images. In particular, the control unit or the downstream image processing device may be configured to stitch image data from different positions of the stage and to generate color representations from monochrome image data stemming from illumination with different wavelength ranges.

According to a further embodiment, the control unit is configured to control the stage to move an offset distance between the separate images, with the offset distance substantially corresponding to a pixel distance or to a multiple of the pixel distance in the monochrome digital camera. An offset distance which substantially corresponds to a pixel distance or to a multiple of the pixel distance in the monochrome digital camera may also be referred to as a distance that has an offset accuracy of between 90% and 110%, in particular of between 95% and 105% of one pixel. In this way, despite the motion of the stage, separate images, as taken in sequence by the monochrome digital camera, may be aligned in a particularly convenient manner. In particular, the alignment between the separate images may be carried out without post-processing in the form of feature detection in the separate images or the like.

According to a further embodiment, the three wavelength ranges comprise a first wavelength range containing blue light, a second wavelength range containing green light, and a third wavelength range containing red light. In this context, blue light may be defined as light having a wavelength of between 450 nm and 490 nm. Further, green light may be defined as light having a wavelength of between 490 nm and 560 nm. Further, red light may be defined as light having a wavelength of between 630 nm and 700 nm. With the first wavelength range containing blue light, the second wavelength range containing green light, and the third wavelength range containing red light, a broad coverage of the visible spectrum may be achieved via the three wavelength ranges. Further, with the three wavelength ranges containing blue light, green light and red light, the separate monochrome digital images may provide for a good basis for generating a color image during the image processing.

According to a further embodiment, the first wavelength range overlaps the second wavelength range and/or the second wavelength range overlaps the third wavelength range. In particular, the first wavelength range may overlap the second wavelength range and the second wavelength range may overlap the third wavelength range. Taking separate monochrome digital images with wavelength ranges that overlap may allow for the generation of color images that are perceived as particularly natural representations by a human observer. In particular, the using of overlapping wavelength ranges may lead to color images that are perceived as being highly accurate in terms of their color representation. This result may at least in part be due to the overlap of the wavelength ranges being similar to how the cone cells of the human eyes work. While being targeted to different colors, the cone cells of the human eyes have some sensitivity to neighboring colors, such that the human brain can infer detailed color information from said transition region between neighboring colors.

According to a further embodiment, the first wavelength range extends at least from 390 nm to 520 nm and/or the second wavelength range extends at least from 470 nm to 640 nm and/or the third wavelength range extends at least from 570 nm to 780 nm.

According to a further embodiment, the three wavelength ranges jointly cover the visible light spectrum. In particular, the three wavelength ranges may jointly extend at least from 390 nm to 780 nm. It is possible that the joint coverage by the three wavelength ranges extends into the infrared light range and/or the ultraviolet light range. Covering the full visible light spectrum may also contribute to a particularly natural and accurate color representation, when assembling the separate monochrome digital images.

According to a further embodiment, the illumination assembly comprises: a first light generation unit for generating a first light output with a first wavelength range; a second light generation unit for generating a second light output with a second wavelength range; a third light generation unit for generating a third light output with a third wavelength range; and a light output combination assembly configured to direct the first light output, the second light output, and the third light output to a sample illumination light path. Each of the first, second, and third light generation units may comprise one or more light sources and one or more optical elements. For example, a light generation unit may comprise a light source, such as an LED, a collimating lens for collimating the light output of the light source, and potentially one or more further optical elements, such as a color filter. In particular, the first light generation unit may comprise a first light source, in particular a first LED, and one or more first light conditioning element(s). Further in particular, the second light generation unit may comprise a second light source, such as a second LED, and one or more second light conditioning element(s). Further in particular, the third light generation unit may comprise a third light source, such as a third LED, and one or more third light conditioning element(s). The sample illumination light path is a common light path for the three light outputs. It may also be referred to as a common sample illumination light path. By providing three separate light generation units, the light outputs with the three different wavelength ranges may be generated separately and may be individually adapted and optimized for the complementary properties that may be desired in the separate monochrome digital images.

According to a further embodiment, the light combination assembly comprises a first light joining element and a second light joining element, with the first light output and the third light output being directed to an intermediate light path by the first light joining element and with the intermediate light path and the second light output being directed to the sample illumination light path by the second light joining element. In this way, a two-stage joining of the first, second, and third light outputs may be realized. The two-stage joining may allow for the first light joining element and the second light joining element to be adapted to exactly two light components to be joined and may provide for said targeted joining to take place in a particularly optically efficient manner. The light combination assembly may be arranged in a parallel light path portion of the illumination assembly. In particular, the first light joining element and the second light joining element may be arranged in a portion of the illumination assembly where the first light output, the second light output, and the third light output are comprised of at least substantially parallel light rays.

According to a further embodiment, each of the first light joining element and the second light joining element is one of a dichroic mirror and a semi-permeable mirror. In a particular embodiment, the first light joining element is a dichroic mirror and the second light joining element is a semi-permeable mirror. The semi-permeable mirror may for example be a 50/50 mirror, reflecting 50% of the incident light and passing 50% of the incident light. The combination of the dichroic mirror as the first light joining element and the semi-permeable mirror as the second light joining element may provide for a particularly good optical efficiency, in particular when using overlapping wavelength ranges. Even when the second wavelength range overlaps with both the first and the third wavelength ranges, the dichroic mirror may combine the first wavelength range and the third wavelength range in a highly accurate and highly efficient manner. The semi-permeable mirror may then accurately join the combination of the first wavelength range and the third wavelength range with the second wavelength range, while providing only a single instance of a substantial optical efficiency loss. In this context, it is noted that the first, second, and third light outputs are not provided at the same time. However, the considerations regarding optical efficiency, when joining the light paths of the first, second, and third light outputs, is still relevant, because the separate monochrome digital images, resulting from the sequence of instances of illumination with the three different wavelengths, are put together in the downstream image processing, when generating the color image.

According to a further embodiment, each of the first light generation unit, the second light generation unit, and the third light generation unit has one of the following features: (i) the respective light generation unit comprises a light source, emitting light of the respective wavelength range; (ii) the respective light generation unit comprises a light source and a color filter, the color filter transmitting light of the respective wavelength range; (iii) the respective light generation unit comprises a light source and a wavelength converter, the wavelength converter converting light from the light source into light of the respective wavelength range; (iv) the respective light generation unit comprises a light source, a wavelength converter and a color filter, the wavelength converter converting light from the light source into an intermediate wavelength range and the color filter transmitting light of the respective wavelength range. In a particular embodiment, the first light generation unit comprises a white light source, in particular a white LED, and a blue color filter and/or the second light generation unit comprises a blue light source, in particular a blue LED, and a color converter, outputting a lime-color spectrum, and/or the third light generation unit comprises a white light source, in particular a white LED, and a red color filter.

According to a particular embodiment, the first light generation unit comprises a first ultraviolet light source, in particular a first ultraviolet LED, and a first color converter and/or the second light generation unit comprises a second ultraviolet light source, in particular a second ultraviolet LED, and a second color converter and/or the third light generation unit comprises a third ultraviolet light source, in particular a third ultraviolet LED, and a third color converter. With the combination of an ultraviolet light source and a color converter, an efficient provision of a desired wavelength range may be provided, without having to rely on a color filter. The ultraviolet light source may emit such short wavelengths that all visible light wavelengths can potentially be provided via conversion. The use of color converters may allow for an efficient and low-cost provision of extended wavelength ranges, as compared to solutions where color filters are custom-designed for passing a particular spectrum with a gradual intensity distribution.

According to a further embodiment, the digital microscope further comprises a second illumination assembly arranged for coupling at least one fluorescence excitation spectrum into the optical system for providing a fluorescence excitation to the sample. As compared to the illumination assembly described hereinbefore, the second illumination assembly is arranged on the opposite side of the stage. In other words, the monochrome digital camera and the second illumination assembly are positioned on the same side of the stage. The second illumination assembly is configured to provide the at least one fluorescence excitation to the sample via the optical system, with the sample's response to the fluorescence excitation again passing the optical system and being captured by the monochrome digital camera. By providing fluorescence excitation, the monochrome digital camera may be used for yet another mode of image acquisition. As compared to previous approaches for light microscopes that have an added function of a fluorescence microscope and that rely on switching between a color camera for the light microscope function and a monochrome camera for the fluorescence microscope function, exemplary embodiments of the invention may allow for eliminating the need for different kinds of cameras. This in turn may eliminate the need for moving cameras within the microscope, which may pose an undesired limitation in terms of alignment accuracy, and/or the need for splitting the light path before reaching the cameras, which may pose an undesired limitation in terms of image acquisition sensitivity. The functionality of a fluorescence microscope may be embedded into the digital microscope at a comparably low increase in complexity.

The second illumination assembly may be arranged for coupling at least one fluorescence excitation spectrum into the optical system. The second illumination assembly may be stationary within the digital microscope and may comprise a coupling element, arranged within the optical system. At said coupling element, the fluorescence excitation may be coupled into the light path of the optical system. The coupling element may be arranged between the microscope objective and the tube objective. It is also possible that the second illumination assembly is movable between a disengaged position and an operation position/engaged position. In the disengaged position, the second illumination assembly may be completely removed from the light path of the optical system. In the operation position/engaged position, the second illumination assembly may be moved to a position with respect to the optical system where a coupling element of the second illumination assembly is arranged for coupling the fluorescence excitation spectrum into the optical path of the optical system. The coupling element may be arranged between the microscope objective and the tube objective in the operation position/engaged position. The moving of the second illumination assembly may be carried out via a dedicated electric motor or the like. The coupling element may be a dichroic mirror or another suitable optical structure for coupling the at least one fluorescence excitation spectrum into the light path through the optical system. In case the coupling element is a dichroic mirror, the dichroic mirror may in particular be configured to reflect the fluorescence excitation spectrum and to pass the spectrum expected from the sample in response to the fluorescence excitation. The spectrum expected in response may be a particular spectrum expected due to the provision of the sample with a particular fluorescent die/marker.

According to a further embodiment, the second illumination assembly comprises: a first fluorescence excitation unit for generating a first fluorescence excitation output having a first excitation spectrum; a second fluorescence excitation unit for generating a second fluorescence excitation output having a second excitation spectrum; an excitation joining element, with the first fluorescence excitation output and the second fluorescence excitation output being directed to a joined excitation path by the excitation joining element; and a multiple bandpass dichroic mirror, configured to reflect both the first excitation spectrum and the second excitation spectrum. In this way, the digital microscope may allow for excitation with two different fluorescence excitation spectrums and may allow for the monochrome digital camera to capture the response to the different fluorescence excitation spectrums via separate images. Using different fluorescence excitation spectrums may in particular be beneficial, where a sample has been treated with different dies/markers that have different fluorescent properties. For example, the sample may have been treated with two different fluorescent substances, with the two different fluorescent substances reacting to different excitation frequencies or reacting with different intensities to different excitation frequencies. The excitation joining element may for example be a dichroic mirror or a semi-permeable mirror.

Fluorescent substances can be configured to adhere to different structures in a sample. In this case, different kinds of images may be generated with the monochrome digital camera. For example, in the case of the sample being a tissue sample, different fluorescent markers may be applied, with one of them adhering to cell walls and another one adhering to cell nuclei.

According to a further embodiment, the multiple bandpass dichroic mirror is transmissive for a first response spectrum and a second response spectrum, as emitted from the sample after excitation with the first excitation spectrum and the second excitation spectrum. In other words, the multiple bandpass dichroic mirror may be configured to be reflective for the excitation spectrums and may be configured to be transmissive for the response spectrums. The multiple bandpass dichroic mirror may be adapted to particular excitation units on the one hand and particular dies/markers on the other hand.

According to a further embodiment, the second illumination assembly comprises more than two fluorescence excitation units, such as three, four, five or more fluorescence excitation units. The second illumination assembly may further comprise two or more excitation joining elements, with said two or more excitation joining elements directing the fluorescence excitation outputs of the three or more fluorescence excitations units to a joint excitation path. The multiple bandpass dichroic mirror may be configured to reflect said three or more excitation spectrums and may be configured to be transmissive for three or more response spectrums, as emitted from the sample after excitation with said three or more excitation spectrums.

According to a further embodiment, the multiple bandpass dichroic mirror is arranged within the optical system, in particular arranged between the microscope objective and the tube objective. In an alternative embodiment, the multiple bandpass dichroic mirror is movable to an operation position within the optical system, in particular movable to an operation position between the microscope objective and the tube objective. The multiple bandpass dichroic mirror may further be movable to a disengaged position, not affecting the light path between the optical system and the monochrome digital camera. The multiple bandpass dichroic mirror may be movable individually or may be movable, as an integral part of the second illumination assembly, by moving the second illumination assembly.

According to a further embodiment, the second illumination assembly comprises a filter wheel. The filter wheel may have a plurality of filter elements that can be rotated into and out of the optical path through the optical system. In particular, the filter wheel may be arranged between the dichroic mirror, forming the coupling element for the fluorescence excitation spectrum(s) into the optical system, and the monochrome digital camera, in particular arranged between the dichroic mirror and the tube objective of the optical system. The filter wheel may have an at least substantially transparent element, which may be present in the optical path, when the light microscope functionality is used. This at least substantially transparent filter element may be a transparent piece of material, such as a piece of glass or polymethyl methacrylate (PMMA). It is also possible that an empty space in the filter wheel forms said at least substantially transparent filter element. In other words, a filter-less position may form part of the filter wheel. The filter wheel may further comprise one or more filter elements that are adapted to one or more response spectrums, as expected to be emitted from the sample after excitation with the one or more excitation spectrums.

Exemplary embodiments of the invention further include a digital microscope system, comprising: a digital microscope, as described in accordance with any of the embodiments above; and an image processing unit; wherein the image processing unit is configured to generate a color image from the separate images taken during illumination with the three wavelength ranges. The image processing unit may be implemented as a dedicated hardware component. It is also possible that the image processing unit is embodied as a software component. This software component may be run on a standard personal computer or server. It is also possible that the image processing unit is embodied as a combination of a dedicated hardware component, equipped with a software component for generating the color image. The image processing unit may further be configured to stitch multiple color images and/or to stitch monochrome images, as taken during multiple cycles through the illumination with the three wavelength ranges, before generating the color image. The additional features, modifications and effects, as described above with respect to the digital microscope, apply to the digital microscope system in an analogous manner.

According to a further embodiment, the digital microscope system further comprises a screen. The digital microscope system may be configured to depict a color image, generated from the separate images taken during illumination with the three wavelength ranges, on the screen. The digital microscope may further be configured to depict one or more images, generated from the one or more response spectrums, captured upon excitation with the one or more fluorescence excitation spectrums.

Exemplary embodiments of the invention further include a method of operating a digital microscope comprising: sequentially illuminating a sample on a stage of the digital microscope with three different wavelength ranges; and taking separate images with a monochrome digital camera of the digital microscope during the illuminating with the three different wavelength ranges. The additional features, modifications and effects, as described above with respect to the digital microscope, apply to the method of operating a digital microscope in an analogous manner.

According to a further embodiment, the method further comprises: generating a color image from the separate images taken during the illuminating with the three different wavelength ranges.

Exemplary embodiments of the invention further include a method of generating an assembled image with a digital microscope, the assembled image representing at least a portion of a sample arranged on a stage of the digital microscope, the method comprising: scanning the sample by repeatedly carrying out the method of operating the digital microscope in accordance with any of the embodiments described above. Said repeated carrying out of the method of operating the digital microscope comprises repeatedly carrying out said method for different positions of the stage. The method of generating an assembled image may comprise: moving the stage and carrying out the method of operating the digital microscope during said moving of the stage. The moving of the stage may be carried out as an at least partially continuous motion of the stage, with the taking of separate images with the monochrome digital camera being carried out during said continuous motion. It is also possible that said moving of the stage is carried out as a start-stop-motion, with the taking of three separate images during the illumination with three different wavelength ranges taking place when the stage is in a stopped position. The method of generating the assembled image may further comprise: stitching of individual color images, with each of the individual color images being generated from separate images taken during the illumination with three different wavelength ranges. The additional features, modifications and effects, as described above with respect to the digital microscope and with respect to the method of operating a digital microscope, apply to the method of generating an assembled image in an analogous manner.

BRIEF DESCRIPTION OF THE DRAWINGS

Further exemplary embodiments of the invention will be described below with reference to the accompanying drawings, wherein.

DETAILED DESCRIPTION OF THE INVENTION

Figure 1:
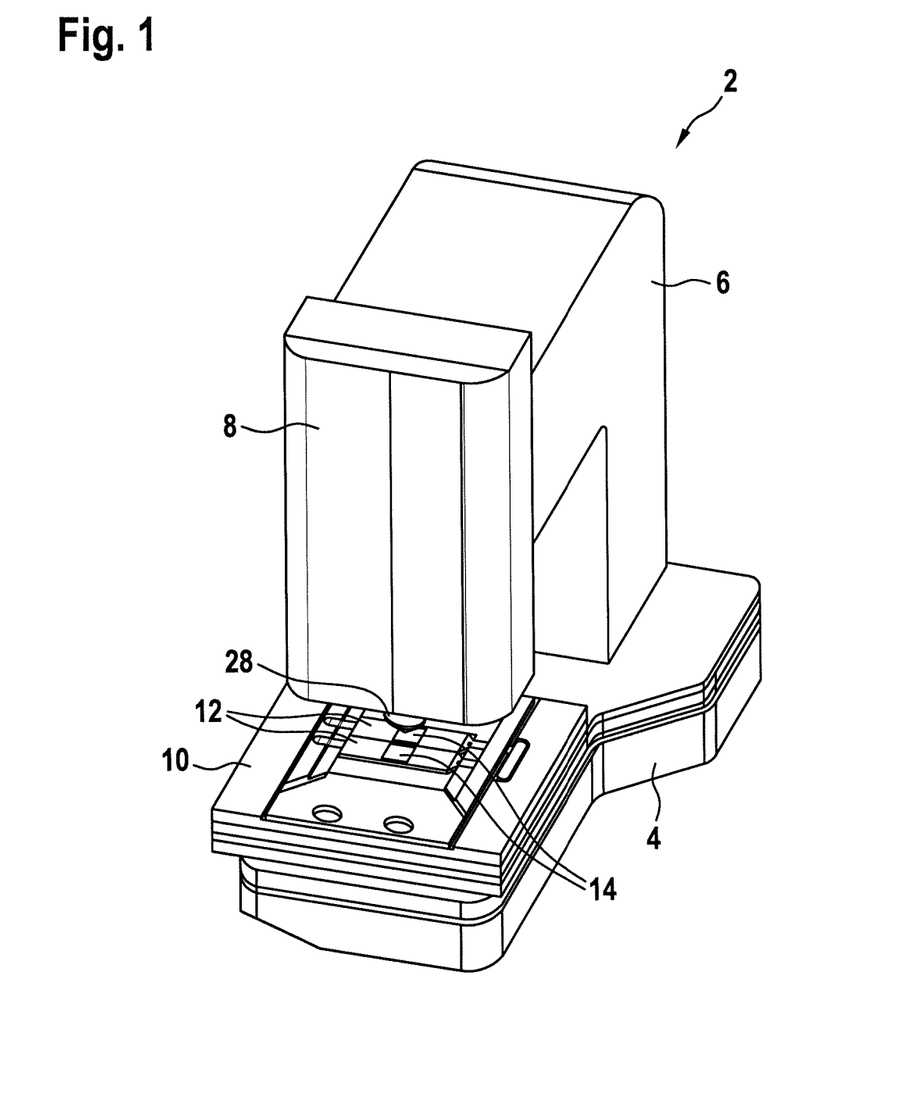
FIG. 1 shows a perspective view of a digital microscope in accordance with an exemplary embodiment of the invention.

FIG. 1 shows a digital microscope 2 in accordance with an exemplary embodiment of the invention in a perspective, three-dimensional view. The digital microscope 2 has a base 4, which supports the digital microscope 2. The base 4 may be placed on a table for providing a secure stand.

The base 4 comprises an illumination assembly and a stage drive assembly, which are housed within and blocked from view in FIG. 1 by a base housing. A stage 10 is mounted to the base 4. The stage is movable with respect to the base 4. In particular, the stage 10 is movable in two dimensions, referred to as x- and y-directions herein. In operation, the stage 10 is moved by the stage drive assembly in the x- and y-directions.

The stage 10 has a light transmissive portion. A sample may be placed on the light transmissive portion of the stage 10. In the operating scenario depicted in FIG. 1, two slides 12 are arranged on the stage via a clipping mechanism. Each of the two slides 12 comprises a sample 14, also referred to as specimen herein. The slides 12 are placed on the stage 10 in such a way that the samples 14 are placed at the light transmissive portion of the stage 10. The light transmissive portion may be made from a transparent or translucent material or may be a cut-out portion of the stage 10. In the latter case, the stage 10 forms a frame, through which light is emitted from the illumination assembly. The plane of that portion of the stage 10 where the samples are arranged is referred to as the x-y-plane of the digital microscope.

The digital microscope 2 further comprises a support arm 6 and an optics and camera housing 8. The support arm 6 is shaped to support the optics and camera housing 8, such that the optics and camera housing 8 hovers over the stage 10. The optics and camera housing 8 houses various optical components. In particular, the optics and camera housing 8 houses a monochrome digital camera and an optical system, which in turn has a tube objective and a microscope objective 28 in the exemplary embodiment of FIG. 1. While the monochrome digital camera and the tube objective are blocked from view in FIG. 1 by the optics and camera housing 8, the microscope objective 28 extends somewhat therefrom towards the stage 10.

The optics and camera housing 8 is movable with respect to the support arm 6 in a moving direction orthogonal to the x-y-plane. In other words, the optics and camera housing 8 is movable in the z-direction of the digital microscope frame of reference. While this motion may be quite limited, it may be sufficient to bring a sample 14 in focus with respect to the optical system contained in the optics and camera housing 8.

In operation, the stage drive assembly brings the stage 10 to desired positions in the x- and y-directions. The stage drive assembly may have any kind of suitable actuators, such as two small-scale electric motors for the two directions of movement. The illumination assembly provides for illumination of the sample 12 from underneath, and image data of a portion of the sample 12, placed in the way of light from the illumination assembly to the monochrome digital camera, can be captured by the monochrome digital camera. Via driving the stage 10 to various positions, image data representing various portions of the sample 14 may be generated.

Figure 2:
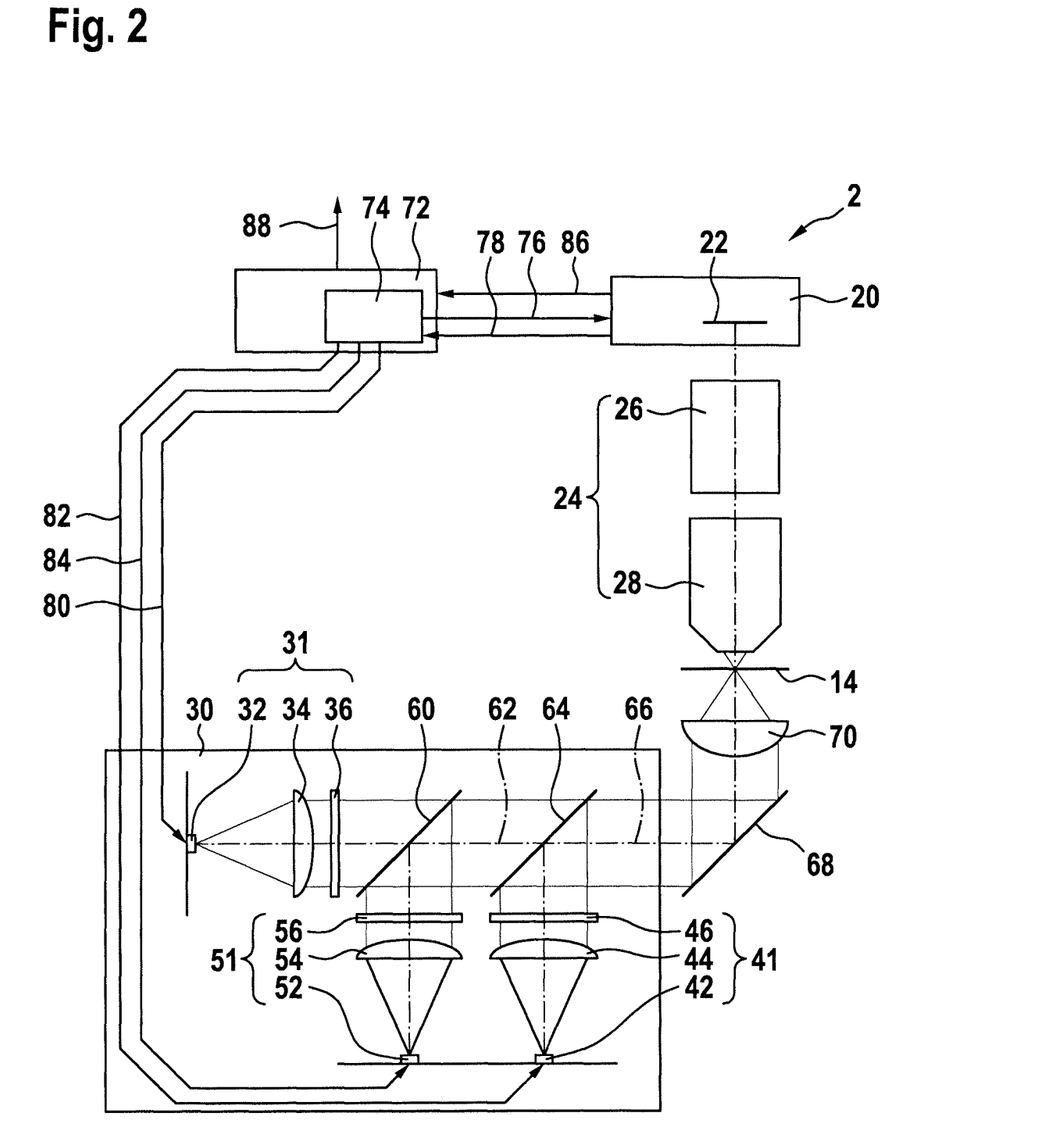
FIG. 2 shows selected components of a digital microscope in accordance with an exemplary embodiment of the invention, partially depicted as a schematic diagram and partially depicted as a block diagram.

FIG. 2 shows selected components of a digital microscope 2 in accordance with an exemplary embodiment of the invention. The components of the digital microscope 2 are partially shown schematically and partially shown as function blocks. The depicted components may be embedded in the digital microscope 2 of FIG. 1 or may be embedded into a different implementation of a digital microscope.

The digital microscope 2 comprises a monochrome digital camera 20. The monochrome digital camera 20 has an image sensor 22, which captures image data via a two-dimensional array of pixel sensors. For each pixel, the monochrome digital camera captures a single sensor value. The monochrome digital camera 20 may be viewed as a grey-scale camera, having a single sensor value dimension from black to white.

The digital microscope 2 further comprises an optical system 24. The optical system 24 comprises a tube objective 26 and a microscope objective 28. The microscope objective 28 and the tube objective 26 provide for magnification of the sample to be viewed via the digital microscope 2 and for directing the light, coming from the sample, towards the image sensor 22 of the monochrome digital camera 20. Such optical systems, comprising a tube objective and a microscope objective, are known in the field of microscopes.

In operation, the optical system 24 and the monochrome digital camera 20 are arranged over the sample 14, in order to capture image data, representing portions or all of the sample 14. As described with respect to FIG. 1, the sample 14 is held in position by a stage 10 of the digital microscope 2. For ease of illustration, said stage is not depicted in FIG. 2. Only the sample 14 is depicted as being exposed to the optical system 24 and the monochrome digital camera 20.

The digital microscope 2 further comprises an illumination assembly 30. The illumination assembly 30 is provided and configured for illuminating the sample 14. In particular, the illumination assembly is provided for shining light onto the sample 14, which light illuminates and passes the sample 14. Said light causes a representation of all or of portions of the sample 14 to be captured in the monochrome digital camera 20, after traveling through the microscope objective 28 and the tube objective 26.

The illumination assembly 30 comprises a first light generation unit 31, a second light generation unit 41, and a third light generation unit 51. The first light generation unit 31 is configured for generating a first light output with a first wavelength range. The second light generation unit 41 is configured for generating a second light output with a second wavelength range. The third light generation unit 51 is configured for generating a third light output with a third wavelength range.

The first light generation unit 31 comprises a first light source 32, a first collimating lens 34, and a first color filter 36. In the exemplary embodiment of FIG. 2, the first light generation unit 31 is configured for generating a first light output with a first wavelength range containing blue light. In particular, in the exemplary embodiment of FIG. 2, the first wavelength range is between 390 nm and 520 nm. For generating the first light output, having said first wavelength range, the first light source 32 is a white LED, and the first color filter 36 is a bandpass filter, passing light within said first wavelength range therethrough. The first color filter 36 may in particular be a gradient filter, having a gradual edge design on one or both sides.

The second light generation unit 41 comprises a second light source 42, a second collimating lens 44, and a second color filter 46. In the exemplary embodiment of FIG. 2, the second light generation unit 41 is configured for generating a second light output with a second wavelength range containing green light. In particular, in the exemplary embodiment of FIG. 2, the second wavelength range is between 470 nm and 640 nm. For generating the second light output, having said second wavelength range, the second light source 42 is a white LED, and the second color filter 46 is a bandpass filter, passing light within said second wavelength range therethrough. The second color filter 46 may in particular be a gradient filter, having a gradual edge design on one or both sides.

The third light generation unit 51 comprises a third light source 52, a third collimating lens 54, and a third color filter 56. In the exemplary embodiment of FIG. 2, the third light generation unit 51 is configured for generating a third light output with a third wavelength range containing red light. In particular, in the exemplary embodiment of FIG. 2, the third wavelength range is between 570 nm and 780 nm. For generating the third light output, having said third wavelength range, the third light source 52 is a white LED, and the third color filter 56 is a bandpass filter, passes light within the third wavelength range therethrough. The third color filter 56 may in particular be a gradient filter, having a gradual edge design on one or both sides.

While it has been described that the first light source 32, the second light source 42, and the third light source 52 are white LEDs and the wavelength range conditioning takes place in the first color filter 36, the second color filter 46, and the third color filter 56, respectively, the three different wavelength ranges may also be generated in different manners. For example, one or more light sources may be configured to provide a dedicated wavelength range. It is also possible that one or more light sources may be provided with a respective wavelength converter. In this way, the need for color filters may be eliminated or the wavelength range conditioning may be split up between the light source and/or the wavelength converter and/or the color filter. For example, the second light generation unit 41 may have a second light source 42 that emits blue light and may have a wavelength converter that generates a lime-colored spectrum. The lime-colored spectrum may be used as the second light output, potentially after some additional filtering via the second color filter.

The illumination assembly 30 further comprises a first light joining element 60 and a second light joining element 64. The first light joining element 60 is configured to direct the first light output and the third light output to an intermediate light path 62. The second light joining element 64 is configured to direct the light from the intermediate light path 62 and the second light output to a sample illumination light path 66, also referred to as output light path 66.

In the exemplary embodiment of FIG. 2, the first light joining element 60 and the second light joining element 64 are provided in a portion of the illumination assembly 30, where the first light output, the second light output, and the third light output are collimated beams, being comprised of substantially parallel light rays. It may also be said that the first light joining element 60 and the second light joining element 64 are arranged in a parallel light path region of the illumination assembly 30.

In the exemplary embodiment of FIG. 2, the first light joining element 60 is a dichroic mirror that passes light of the first wavelength range, i.e. light within the wavelength range of between 390 nm and 520 nm, therethrough and that reflects light of the third wavelength range, i.e. light within the wavelength range of between 570 nm and 780 nm. With the first wavelength range and the third wavelength range being disjunct, i.e. with the first wavelength range and the third wavelength range not overlapping, the dichroic mirror 60 may be configured to join all or substantially all of the first light output and the third light output in a highly accurate and highly optically efficient manner.

In the exemplary embodiment of FIG. 2, the second light joining element 64 is a semi-permeable mirror, passing substantially half of the light from the intermediate light path 62 to the sample illumination light path 66 and reflecting substantially half of the second light output onto the sample illumination light path 66. In this way, a loss of about 50% may be uniformly applied to the first light output, the second light output, and the third light output. Accordingly, about 50% of the first light output, the second light output and the third light output may be coupled out of the illumination assembly 30 on the common sample illumination light path 66.

With the illumination assembly 30 of FIG. 2, a high optical efficiency may be achieved, without having to rely on any movable components. With the first light generation unit 31, the second light generation unit 41, the third light generation unit 51, the first light joining element 60, and the second light joining element 64 being stationary within the illumination assembly 30, a highly accurate and highly reliable light output for all three wavelength ranges may be achieved. With the combination of the dichroic mirror and the semi-permeable mirror as the first and second light joining elements 60, 64, the joining of the three light outputs may be associated with a total loss of only about 50%.

In the exemplary embodiment of FIG. 2, the light on the sample illumination light path 66 is directed towards the sample 14 by a re-directing reflector 68 and a condenser 70. The condenser 70 provides for a high light intensity at the sample 14 and a strong illumination of the sample 14. Also, the collimating action of the condenser is adapted to the arrangement of the optical system 24, contributing to a high representation quality in the digital images at short shutter speeds of the monochrome digital camera 20. While the re-directing reflector 68 and the condenser 70 are depicted as being arranged outside the illumination assembly 30, it is also possible to consider these optical elements as part of the illumination assembly 30. Further, it is possible to arrange the components of the illumination assembly 30 in different orientations, eliminating the need for the re-directing reflector 68.

The digital microscope 2 further comprises a control unit 72. The control unit 72 is coupled to the monochrome digital camera 20 and to the illumination assembly 30. The control unit 72 is in particular configured for controlling the monochrome digital camera 20 and the illumination assembly 30. The control unit 72 comprises a timing unit 74, which is configured for providing a synchronized control of the monochrome digital camera 20 and the illumination assembly 30. The timing unit 74 is coupled to the first light source 32 via a first illumination control line 80. The timing unit 74 is coupled to the second light source 42 via a second illumination control line 82. The timing unit 74 is coupled to the third light source 52 via a third illumination control line 84. Via the first illumination control line 80, the second illumination control line 82, and the third illumination control line 84, the timing unit 74 is able to selectively provide illumination via the first light generation unit 31 or the second light generation unit 41 or the third light generation unit 51. The timing unit 74 is coupled to the monochrome digital camera via a camera control line 76 and via a camera feedback line 78. In this way, the timing unit 74 can control the monochrome digital camera 20 to capture image data, and the monochrome digital camera 20 can provide feedback on the capturing of image data. The monochrome digital camera 20 is further coupled to the control unit 72 via an image data connection 86. The control unit 72 is configured to receive image data via said image data connection 86 and to pass on said image data via an image data interface 88 for downstream image processing.

In operation, the timing unit 74 synchronizes the illumination assembly 30 and the monochrome digital camera 20. In particular, the timing unit 74 provides a sequence of light flashes with the first wavelength range, the second wavelength range and the third wavelength range. For each of these light flashes, the timing unit 74 controls the monochrome digital camera 20 to capture image data of the sample 14. In this way, the control unit 72 may cause a sequence of monochrome digital images to be taken by the monochrome digital camera 20, with subsequent ones of the monochrome digital images representing the sample 14 under different illumination conditions. With the three monochrome digital images taken at said first, second, and third wavelength ranges, as described above, the image data, as taken by the monochrome digital camera 20, may be assembled into a color image in the downstream image processing. Accordingly, sufficient image data is generated to provide color images of the sample 14, without having to rely on a color camera in the digital microscope 2.

The control unit 72 may further be coupled to the stage 10 of the digital microscope 2, which is not shown in FIG. 2, but for example illustrated in FIG. 1. Via a coordinated control of the stage 10, the monochrome digital camera 20, and the illumination assembly 30, the control unit 72 may cause a scanning of the sample 14 to be carried out. In particular, the stage 10 may be controlled to move in a row-wise or column-wise manner, in particular in a meandering manner, and a series of monochrome digital images may be taken during the motion of the stage 10. The series of images may comprise subsets of images, each subset representing different portions of the sample at illumination with a particular wavelength range. The downstream image processing may on the one hand stitch the image data, as taken by the monochrome digital camera 20, and may on the other hand assemble the monochrome images into color images.

Figure 3:
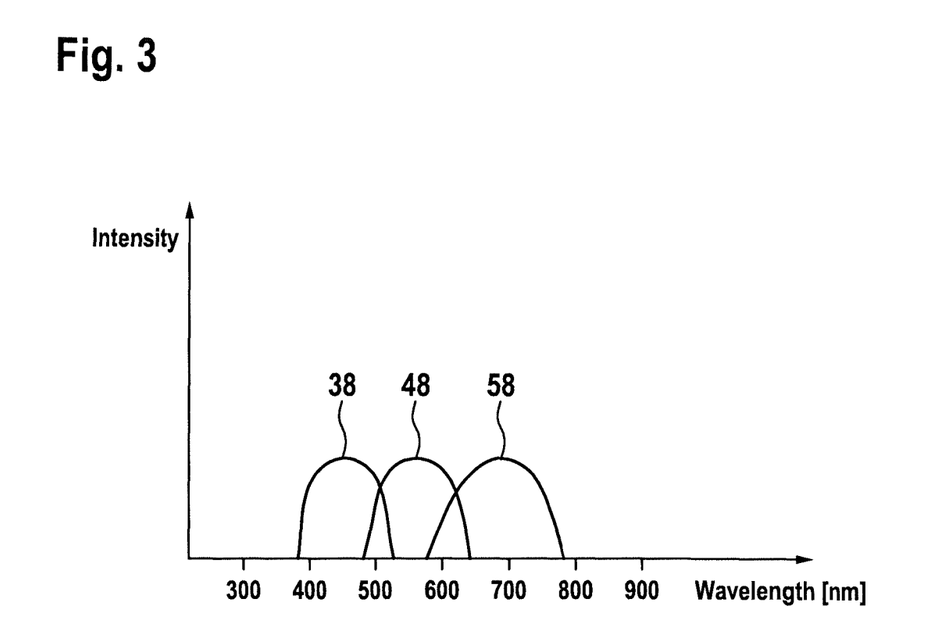
FIG. 3 illustrates exemplary spectrums of three light outputs, as may be provided by the illumination assembly of the digital microscope of FIG. 2, in a schematic manner.

FIG. 3 illustrates three exemplary wavelength ranges, as may be provided by the first light generation unit 31, the second light generation unit 41, and the third light generation unit 51 of the digital microscope 2 of FIG. 2. In particular, FIG. 3 illustrates a first light output spectrum 38, which may be the spectrum of the first light output, as described above with respect to FIG. 2. Further in particular, FIG. 3 illustrates a second light output spectrum 48, which may be the spectrum of the second light output, as described above with respect to FIG. 2. Yet further in particular, FIG. 3 illustrates a third light output spectrum 58, which may be the spectrum of the third light output, as described above with respect to FIG. 2.

As can be seen from FIG. 3 and as is apparent from the description of the first, second and third wavelength ranges above, the first wavelength range overlaps with the second wavelength range and the second wavelength range overlaps with the third wavelength range. In other words, the first light output spectrum 38 overlaps with the second light output spectrum 48 and the second light output spectrum 48 overlaps with the third light output spectrum 58.

The overlapping of the first and second wavelength ranges and of the second and third wavelength ranges allows for a particularly natural representation of the color image, after assembling the monochrome digital images, as taken by the monochrome digital camera 20. The overlap allows for the monochrome digital images to have image information that allows for the human observer to gauge the color content in the transition regions between the different wavelength ranges particularly well. In this way, the resulting color images may be perceived as particularly accurate and/or particularly natural in terms of their colors.

Figure 4:
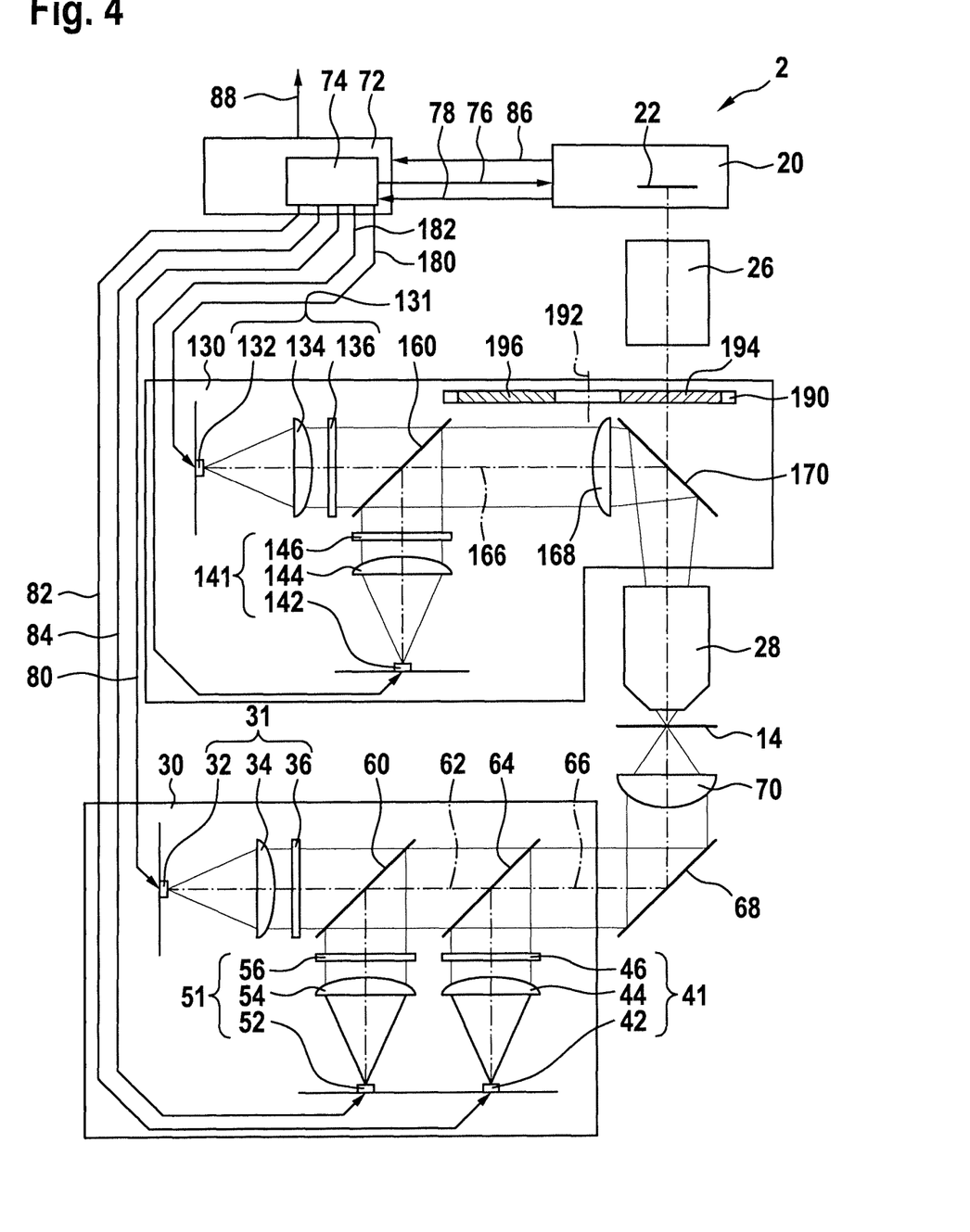
FIG. 4 shows selected components of a digital microscope in accordance with another exemplary embodiment of the invention, partially depicted as a schematic diagram and partially depicted as a block diagram.

FIG. 4 shows selected components of a digital microscope 2 in accordance with another exemplary embodiment of the invention. Similar to FIG. 2, the digital microscope 2 of FIG. 4 is partially depicted as a schematic diagram and partially depicted as a block diagram. Many of the components of the digital microscope 2 of FIG. 4 are similar or identical to the respective components of the digital microscope 2 of FIG. 2. They are provided with the same reference numerals, and reference is made to their description above. In particular, the digital microscope 2 of FIG. 4 has all the components of the digital microscope 2 of FIG. 2 and is capable of performing the functionality described above. In addition, the digital microscope 2 of FIG. 4 is capable of acting as a fluorescence microscope. For this purpose, the digital microscope 2 of FIG. 4 has additional components, which will be described below.

The digital microscope 2 of FIG. 4 comprises a second illumination assembly 130. The second illumination assembly 130 comprises a first fluorescence excitation unit 131 and a second fluorescence excitation unit 141. With the first fluorescence excitation unit, the second illumination assembly 130 is capable of generating a first fluorescence excitation output having a first excitation spectrum. With the second fluorescence excitation unit 141, the second illumination assembly 130 is capable of generating a second fluorescence excitation output having a second excitation spectrum.

The first fluorescence excitation unit 131 comprises a first excitation source 132, a first excitation collimating lens 134, and a first excitation filter 136. The second fluorescence excitation unit 141 comprises a second excitation source 142, a second excitation collimating lens 144, and a second excitation filter 146. The second illumination assembly 130 further comprises an excitation joining element 160. The excitation joining element 160 is arranged to direct the first fluorescence excitation output, as generated by the first fluorescence excitation unit 131, and the second fluorescence excitation output, as generated by the second fluorescence excitation unit 141, to a joined excitation path 166. In the exemplary embodiment of FIG. 4, the excitation joining element 160 is a dichroic mirror, passing the first fluorescence excitation output, coming from the first fluorescence excitation unit 131, and reflecting the second fluorescence excitation output, coming from the second fluorescence excitation unit 141. In an alternative embodiment, the excitation joining element may be a semi-permeable mirror. In the exemplary embodiment of FIG. 4, the excitation joining element 160 is provided in a portion of the second illumination assembly 130, where the first fluorescence excitation output and the second fluorescence excitation output are collimated beams, being comprised of substantially parallel light rays.

The second illumination assembly 130 further comprises an excitation condenser 168 and a multiple bandpass dichroic mirror 170. The multiple bandpass dichroic mirror 170 is arranged to direct the first fluorescence excitation output and the second fluorescence excitation output from the joined excitation path 166 towards the microscope objective 28 and, thus, towards the sample 14. The multiple bandpass dichroic mirror 170 reflects both the first excitation spectrum and the second excitation spectrum. In this way, the multiple bandpass dichroic mirror 170 is arranged and configured to provide two different kinds of fluorescence excitation to the sample 14.

In operation, any of the first fluorescence excitation output and the second fluorescence excitation output may cause a fluorescent response at the sample 14. In particular, the sample 14 may be provided with two fluorescent markers, with each of the two fluorescent markers reacting to one of the first excitation spectrum and the second excitation spectrum. The first and second markers may be configured to emit a fluorescent response that is somewhat longer in wavelength than the respective excitation spectrum. In other words, the fluorescent response may be lower energy radiation than the respective excitation. When being emitted from the sample 14, the fluorescent responses travel through the microscope objective 28, through the multiple bandpass dichroic mirror 170 of the second illumination assembly 130, and through the tube objective 26. Again, the microscope objective 28 and the tube objective 26 may be jointly referred to as the optical system 24 of the digital microscope 2. The multiple bandpass dichroic mirror 170 is configured to be transmissive for both fluorescent responses. Accordingly, the fluorescent responses pass the multiple bandpass dichroic mirror 170 and travel towards the monochrome digital camera 20.

In the exemplary embodiment of FIG. 4, the second illumination assembly 130 further comprises a filter wheel 190. The filter wheel 190 is rotatable around a rotation axis 192. The filter wheel 190 comprises a first filter 194 and a second filter 196. The first filter 194 and the second filter 196 may be adapted to the fluorescent responses, as emitted by the sample 14 after being excited with the first fluorescence excitation output and the second fluorescence excitation output. In this way, radiation components that are not the result of the response of the sample 14 may be filtered out, and the resulting images, as taken by the monochrome digital camera 20, may be a particularly accurate representation of the fluorescent responses.

In the exemplary embodiment of FIG. 4, the timing unit 74 is coupled to the first excitation source 132 via a first excitation control line 180 and coupled to the second excitation source 142 via a second excitation control line 182. In this way, the control unit may provide for the selective provision of the first fluorescence excitation output or the second fluorescence excitation output. Together with the control of the monochrome digital camera 20, the control unit 72 is configured to synchronize the fluorescence excitation by the second illumination assembly 130 and the capturing of image data of the fluorescent response by the monochrome digital camera 20.

The second illumination assembly 130 may be stationary within the digital microscope 2. In this case, the operation of the digital microscope 2 with the first wavelength range, the second wavelength range and the third wavelength range, as discussed above with respect to FIGS. 2 and 3, takes place with the multiple bandpass dichroic mirror 172 arranged in the light path through the optical system 24 and to the monochrome digital camera 20. In this case, the multiple bandpass dichroic mirror 170 is configured to be transmissive for all of the first wavelength range, the second wavelength range, and the third wavelength range. Accordingly, the multiple bandpass dichroic mirror 170 has no or only a small detrimental effect on the optical efficiency of the light microscope operation, described above with respect to FIGS. 2 and 3. For this set-up, the filter wheel 190 may have a no-filter-portion, such that the light path between the multiple bandpass dichroic mirror 170 and the monochrome digital camera 20 is unaffected by the filter wheel 190. Instead of a no-filter-portion, an at least substantially transparent filter element may be provided in the filter wheel 190.

With the digital microscope 2 of FIG. 4, color images of a sample 14 as well as fluorescent response images of a sample 14 may be generated with the use of a single monochrome digital camera 20. A wide range of functions may be achieved at a comparably low degree of complexity. Also, all of the discussed functions may be achieved with a set-up that has a stationary camera and does not rely on any sort of camera switching, neither via moving different cameras into the light path nor via splitting the light path before reaching different cameras.

While it has been described that the second illumination assembly 130 comprises a first fluorescence excitation unit 131 and a second fluorescence excitation unit 141, it is also possible that the second illumination assembly 130 comprises only a single fluorescence excitation unit or more than two fluorescence excitation units, such as three or four or five or more fluorescence excitation units.

Figure 5:
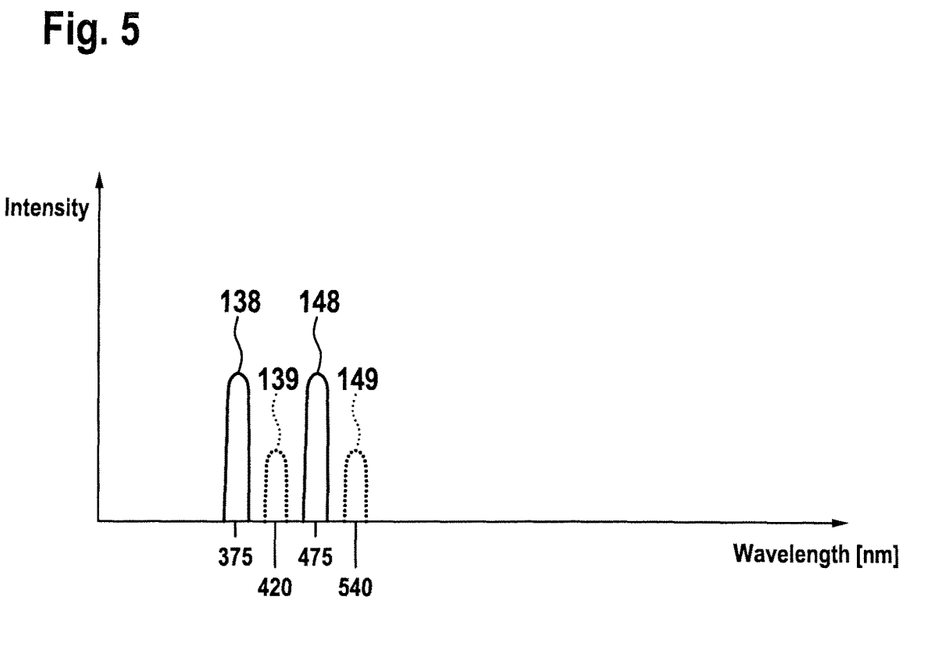
FIG. 5 illustrates exemplary fluorescence excitation spectrums and exemplary response spectrums, as may be present in the digital microscope of FIG. 4, when operated as a fluorescence microscope, in a schematic manner.

FIG. 5 illustrates exemplary fluorescence excitation spectrums and exemplary response spectrums, as may be present in the digital microscope 2 of FIG. 4, when operated as a fluorescence microscope. In particular, the first excitation spectrum 138 may be the spectrum of the first light output, as provided by the first fluorescence excitation unit 131. The second excitation spectrum 148 may be the spectrum of the second light output, as provided by the second fluorescence excitation unit 141. Both the first excitation spectrum 138 and the second excitation spectrum are comparably narrow spectrums. They may each be targeted to excite a particular fluorescent substance.

In the exemplary operating scenario of FIG. 4, the sample 14 may be furnished with a first marker and with a second marker. The first marker may be configured to react to the first excitation spectrum 138, and the second marked may be configured to react to the second excitation spectrum 148. In response to excitation with the first excitation spectrum 138, the first marker may emit radiation with a first response spectrum 139, as depicted in FIG. 5. In response to excitation with the second excitation spectrum 148, the second marker may emit radiation with a second response spectrum 149, also depicted in FIG. 5. The first and second response spectrums 139, 149 have longer wavelengths than the respective excitation spectrums. Also, the intensity of the first and second response spectrums 139, 149 is lower than the intensity of the first and second excitation spectrums 138, 148. These effects are due to the fluorescence action itself dissipating energy, which results in the longer wavelength, and due to the wider spread of the radiation of the response, as compared to the highly targeted first and second fluorescence excitation outputs.

The multiple bandpass dichroic filter 170, as arranged in the second illumination assembly 130 of the digital microscope 2 of FIG. 4, is configured to reflect the wavelengths of the first and second excitation spectrums 138, 148 and to pass the wavelengths of the first and second response spectrums 139, 149. In this way, the multiple bandpass dichroic mirror 170 is able to direct the first and second fluorescence excitation outputs from the second illumination assembly 130 towards the sample 14 and to pass the respective fluorescent responses, coming from the sample 14, towards the monochrome digital camera 20.

In FIG. 5, the first excitation spectrum 138 is depicted as centered around a wavelength of about 375 nm, and the second excitation spectrum 148 is depicted as centered around a wavelength of about 475 nm. Further, the first response spectrum 139 is depicted as centered around a wavelength of about 420 nm, and the second response spectrum 149 is depicted as centered around a wavelength of about 540 nm. All of the first and second excitation spectrums 138, 148 and the first and second response spectrums 139, 149 are depicted as having a bandwidth of about 30 nm. It is pointed out that these values are exemplary only and that various considerations may be taken into account, when selecting the first and second excitation spectrums and the dies/markers, which determine the first and second response spectrums. For example, the embodiment of the second illumination assembly 130 being stationary or movable may be taken into account. With the second illumination assembly 130 being stationary, the multiple bandpass dichroic mirror 170 may be adapted to all of the first and second excitation spectrums 138, 148, the first and second response spectrums 139, 149, and the first, second, and third wavelength ranges discussed above with respect to FIGS. 2 and 3.

As an example, some properties of common dies/markers will be laid out. For example, the DAPI marker may be excited with a fluorescence excitation spectrum extending between 352 nm and 402 nm, and the fluorescent response may be filtered for an associated fluorescent response spectrum from 417 nm to 477 nm. As a further example, the FITC marker may be excited with a fluorescence excitation spectrum extending between 450 nm and 500 nm, and the fluorescent response may be filtered for an associated fluorescent response spectrum from 515 nm to 565 nm. As a yet further example, the TRITC marker may be excited with a fluorescence excitation spectrum extending between 542 nm and 566 nm, and the fluorescent response may be filtered for an associated fluorescent response spectrum from 582 nm to 636 nm.

It is pointed out that the considerations regarding the moving of the stage of the digital microscope 2, the scanning of the sample 14 via capturing image data at various positions of the stage, and the stitching of the image data for generating an assembled image, as laid out above with respect to FIG. 2, apply to the fluorescence microscope functionality in an analogous manner.

Figure 6:
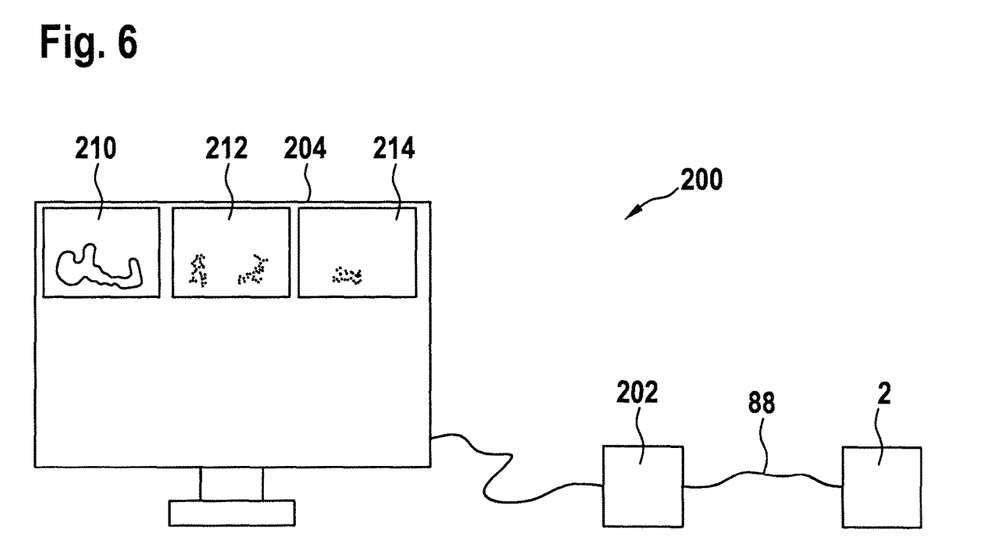
FIG. 6 shows a digital microscope system in accordance with an exemplary embodiment of the invention, as seen from a user perspective, partially depicted as a schematic diagram and partially depicted as a block diagram.

FIG. 6 shows a digital microscope system 200 in accordance with an exemplary embodiment of the invention, partially depicted as a schematic diagram and partially depicted as a block diagram. The digital microscope system 200 comprises a digital microscope 2. The digital microscope 2 may be a digital microscope 2 having the mechanical set-up as described with respect to FIG. 1 above and the optical and control set-up as described with respect to FIGS. 2 and 3 or FIGS. 4 and 5 above.

The digital microscope system 200 further comprises a computer 202, coupled to the digital microscope 2 via an image data interface 88. The digital microscope system 200 further comprises a screen 204, coupled to the computer 202. The computer 202 may be any kind of suitable processing device that has image processing capabilities and that provides for the interaction between the screen 204 and the digital microscope 2 in a suitable manner. The computer 202 may for example be a standard personal computer, embodied as a desktop computer or a laptop. The processing capacity, exemplarily provided by the computer 202 in the exemplary embodiment of FIG. 3, may also be embedded into the digital microscope 2 or into the screen 204. The screen 204 may for example be part of a tablet or a smartphone, having both the screen functionality and the processing functionality for interfacing directly with the digital microscope 2. It is also possible that the processing capacity, exemplarily provided by the computer 202 in the exemplary embodiment of FIG. 6, may be provided on a remote processing device, such as a remote server as part of a cloud-based solution.

FIG. 6 depicts an exemplary output on the screen 204, after a sample has been scanned with the light microscope functionality, as described above with respect to FIGS. 2 and 3, and after the sample has been scanned with the fluorescence microscope functionality, as described above with respect to FIGS. 4 and 5. The output on the screen 204 comprises a color image 210 of the sample. The color image 210 may be generated and provided to the screen 204 by the computer 202. The color image is the result of the assembling of a sequence of monochrome images, with the individual images of the sequence of monochrome images each corresponding to a particular position of the stage, i.e. to a particular portion of the sample, and resulting from illumination with a particular wavelength range. The output on the screen 204 further comprises a first fluorescent response image 212, representing the response of the sample 14 to excitation with the first fluorescence excitation output. The output on the screen 204 further comprises a second fluorescent response image 214, representing the response of the sample 14 to excitation with the second fluorescence excitation output. The first and second fluorescence response images 212, 214 may be generated and provided to the screen 204 by the computer 202. The first and second fluorescent response images 212, 214 have image features at different portions of the sample 14, indicating that different portions of the sample 14 have different properties. In particular, the different portions of the sample 14 may have sample elements, to which the first and second markers adhere differently.

The screen 204 may also be a control interface for the user of the digital microscope system 200. In the exemplary embodiment of FIG. 6, the screen 204 is a touch screen, so that the screen 204 provides both user input functionality and image output functionality. The user may control the whole operation of the digital microscope system 200 via the touch screen 204. However, it is also possible that other input devices are provided in addition/as an alternative to the touch screen 204. For example, a keyboard and/or a mouse and/or any other suitable input device may be provided for the user to control the digital microscope system 200. It is also possible that multiple screens are provided for the output of images. It is further possible that images are output to other entities. For example, images may be saved to a hard drive or other data storage medium in a file format.

The digital microscope and the digital microscope system, as described herein, may be used with any kind of sample/specimen. The sample may in particular be a biological sample. The biological sample may be a pathological sample, such as a human or animal tissue sample. The term tissue may refer to any kind of substance having been taken from a patient, with the term patient being understood to refer to humans and animals. Images of tissue samples taken from a dead human body or from a dead animal are also considered as being taken from a patient. The term tissue encompasses all kinds of substances of a human or animal body, such as skin tissue, bone tissue, muscle tissue, organ tissue, brain tissue, etc. The biological sample may also be a cell culture sample, for example taken from a yeast-containing substance.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A digital microscope, comprising:
a stage for holding a sample;
a monochrome digital camera;
an optical system, arranged between the stage and the monochrome digital camera;
an illumination assembly for illuminating the sample; and
a control unit for controlling the monochrome digital camera and the illumination assembly;
wherein the illumination assembly is configured to provide illumination with three different wavelength ranges, the three wavelength ranges comprising a first wavelength range containing blue light, a second wavelength range containing green light, and a third wavelength range containing red light, wherein the first wavelength range overlaps the second wavelength range, and the second wavelength range overlaps the third wavelength range, and
wherein the control unit is configured to control the illumination assembly to sequentially provide illumination with the three different wavelength ranges and wherein the control unit is configured to control the monochrome digital camera to take separate images during illumination with the three different wavelength ranges.

2. The digital microscope according to claim 1, wherein the control unit is configured to control the illumination assembly to sequentially provide light flashes with the three different wavelength ranges.

3. The digital microscope according to claim 1, wherein the control unit is configured to control the stage to move, while the monochrome digital camera takes the separate images during illumination of the stage with the three different wavelength ranges.

4. The digital microscope according to claim 1, wherein the illumination assembly comprises:
a first light generation unit for generating a first light output with a first wavelength range;
a second light generation unit for generating a second light output with a second wavelength range;
a third light generation unit for generating a third light output with a third wavelength range; and
a light output combination assembly configured to direct the first light output, the second light output, and the third light output to a sample illumination light path.

5. The digital microscope according to claim 4, wherein the light combination assembly comprises a first light joining element and a second light joining element, with the first light output and the third light output being directed to an intermediate light path by the first light joining element and with the intermediate light path and the second light output being directed to the sample illumination light path by the second light joining element.

6. The digital microscope according to claim 5, wherein each of the first light joining element and the second light joining element is one of a dichroic mirror and a semi-permeable mirror.

7. The digital microscope according to claim 4, wherein each of the first light generation unit, the second light generation unit and the third light generation unit has one of the following features:
(i) the respective light generation unit comprises a light source, emitting light of the respective wavelength range;
(ii) the respective light generation unit comprises a light source and a color filter, the color filter transmitting light of the respective wavelength range;
(iii) the respective light generation unit comprises a light source and a wavelength converter, the wavelength converter converting light from the light source into light of the respective wavelength range;
(iv) the respective light generation unit comprises a light source, a wavelength converter and a color filter, the wavelength converter converting light from the light source into an intermediate wavelength range and the color filter transmitting light of the respective wavelength range.

8. The digital microscope according to claim 1, further comprising a second illumination assembly arranged for coupling at least one fluorescence excitation spectrum into the optical system for providing fluorescence excitation to the sample.

9. The digital microscope according to claim 8, wherein the second illumination assembly comprises:
 a first fluorescence excitation unit for generating a first fluorescence excitation output having a first excitation spectrum;
 a second fluorescence excitation unit for generating a second fluorescence excitation output having a second excitation spectrum;
 an excitation joining element, with the first fluorescence excitation output and the second fluorescence excitation output being directed to a joined excitation path by the excitation joining element; and
 a multiple bandpass dichroic mirror, configured to reflect both the first excitation spectrum and the second excitation spectrum.

10. The digital microscope according to claim 8, wherein the second illumination assembly comprises a filter wheel.

11. The digital microscope according to claim 1, wherein the control unit is configured to control the illumination assembly to sequentially provide light flashes of a duration of less than 10 ms with the three wavelength ranges.

12. The digital microscope according to claim 1, wherein the control unit is configured to control the illumination assembly to sequentially provide light flashes of a duration of between 5 μs and 100 μs with the three wavelength ranges.

13. The digital microscope according to claim 3, wherein the control unit is configured to control the stage to move an offset distance between the separate images, with the offset distance substantially corresponding to a pixel distance or to a multiple of the pixel distance in the monochrome digital camera.

14. The digital microscope according to claim 6, wherein the first light joining element is a dichroic mirror and the second light joining element is a semi-permeable mirror.

15. The digital microscope according to claim 9, wherein the multiple bandpass dichroic mirror is arranged within the optical system or movable to an operation position within the optical system.

16. A digital microscope system, comprising:
 a digital microscope according to claim 1; and
 an image processing unit;
 wherein the image processing unit is configured to generate a color image from the separate images taken during illumination with the three wavelength ranges.

17. A method of operating a digital microscope, wherein the digital microscope comprises a stage for holding a sample, a monochrome digital camera, an optical system, arranged between the stage and the monochrome digital camera, and an illumination assembly, with the stage being movable with respect to the monochrome digital camera, the optical system, and the illumination assembly, the method comprising:
 sequentially illuminating the sample on the stage of the digital microscope with three different wavelength ranges, wherein the three different wavelength ranges comprise a first wavelength range containing blue light, a second wavelength range containing green light, and a third wavelength range containing red light, wherein the first wavelength range overlaps the second wavelength range and wherein the second wavelength range overlaps the third wavelength range; and
 taking separate images with the monochrome digital camera of the digital microscope during the illuminating with the three different wavelength ranges.

18. The method according to claim 17, further comprising:
 generating a color image from the separate images taken during the illuminating with the three different wavelength ranges.

19. A method of generating an assembled image with a digital microscope, the assembled image representing at least a portion of a sample arranged on a stage of the digital microscope, the method comprising:
 scanning the sample by repeatedly carrying out the method of operating the digital microscope according to claim 17.

* * * * *